April 12, 1960   H. MacDONALD DAVIS ET AL   2,932,790
ELECTRICAL TESTING APPARATUS
Filed March 23, 1956   3 Sheets-Sheet 1

Inventors
Herbert MacDonald Davis
Joyce Elizabeth Seaborn
By Cushman, Darby & Cushman
Attorneys

United States Patent Office 2,932,790
Patented Apr. 12, 1960

2,932,790

ELECTRICAL TESTING APPARATUS

Herbert MacDonald Davis, Barnehurst, and Joyce Elizabeth Seaborn, London, England, assignors to National Research Development Corporation, London, England, a corporation of Great Britain Application March 23, 1956, Serial No. 573,410

Claims priority, application Great Britain March 25, 1955

11 Claims. (Cl. 324—61)

The present invention relates to electrical testing apparatus for detecting by an alternating current bridge method imperfections in manufactured articles.

The invention is concerned with providing apparatus for detecting internal flaws and other imperfections in articles which are also subject to minor dimensional variations which may be sufficient to affect the balance of the instrument or otherwise obscure the detection of the flaws.

The invention is particularly applicable to testing apparatus which comprises a capacitance bridge circuit which in its simplest form is arranged to measure the capacitance between two parallel plates when the article to be tested is placed between them. Apparatus of this type according to the present invention may be readily employed to detect by a capacitance method flaws in moulded plastic articles, which, due to shrinkage during the moulding process, have a slight concavity on one or more moulded surfaces. If a simple capacitance bridge were to be used, which in effect determines the capacity between the two metal plates with the article to be tested between them and compares the result with that obtained with a standard article, the total variation from standard of the thickness of the article under test may be so great as to seriously unbalance the bridge even in the absence of internal voids in the article.

The invention is also applicable to testing apparatus which employs alternating current circuits containing various other types of inductively or capacitatively reactive impedance components which are arranged to have their impedance values modified by the article under test. For example, an iron or steel article may be examined by arranging for it to be made part of the magnetic circuit of an electromagnetic pick-up head in which the impedance of the electrical winding is varied by changes in the reluctance of the magnetic circuit caused by flaws in the article under test.

It is an object of the invention to provide an alternating current testing apparatus which is relatively insensitive to gradual variations in thickness of articles being tested while retaining full sensitivity to local defects.

The present invention enables this object to be attained in testing apparatus in which there is provided two similar alternating current circuits, each having a small similar electrical component with a reactive impedance which are placed adjacent to each other side by side against the article to be tested, and which, by comparing the current flow through the two components when the article is moved relative to them, can readily detect flaws as they cause a substantial unbalance between the two currents whereas gradual changes in the size of the article cause a relatively very slight unbalance. In accordance with the invention, the effect of interaction between the two adjacent components which would very seriously decrease the sensitivity of the testing apparatus, is substantially minimised by arranging for the alternating currents applied to the two components to be substantially out of both phase and anti-phase (e.g., in quadrature) and for the comparison of the two current flows to be of the current through each component during only the half cycles in which the current therethrough for each component is in a particular sense.

According to the present invention therefore, an electrical testing apparatus comprises two similar alternating current channels, each channel containing an electrical circuit component which has a reactive impedance, said two components being electrically equivalent to each other and positioned adjacent to each other while capable of being sited close to an article under test, means for feeding the two channels with alternating currents which are substantially out of both phase and anti-phase, a phase-sensitive circuit for each channel for producing a signal in accordance with the current flow through its channel during half cycles in which the alternating current applied thereto is in a given sense, and a comparison circuit for producing an output signal in accordance with the difference between the signals produced by the two phase-sensitive circuits.

A particular type of electrical testing apparatus according to the invention comprises two similar alternating current channels, each channel containing a capacitor having a pair of plates, the corresponding plates of each pair being placed side by side so that an article to be tested can be passed between the two pairs of plates under similar conditions to act as the dielectric of the capacitors, means for feeding the two channels with alternating currents which are in quadrature, a phase-sensitive circuit in each channel for producing a signal in accordance with the current flow through its channel during half cycles in which the alternating current applied thereto is in a given sense, and a comparison circuit for producing an output signal in accordance with the difference between the signals produced by the two phase-sensitive circuits.

An electrical testing apparatus in accordance with the invention, which employs two capacitors to examine an article made of a plastic material will now be described by way of example with reference to the accompanying drawings in which:

Figure 3 shows in greater detail a circuit arrangement of part of the apparatus shown in Figure 1; while

Figure 1:
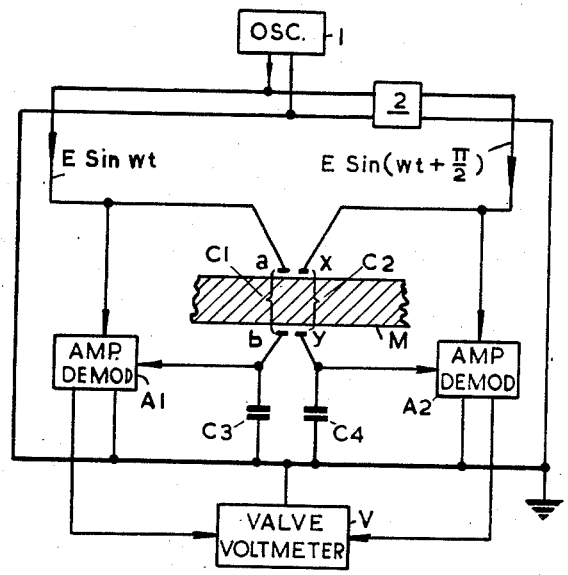
Figure 1 is a schematic circuit diagram of the testing apparatus.

In the arrangement shown in Figure 1, an oscillator 1 and a phase-changing circuit 2 are employed to generate two alternating voltages $E \sin \omega t$ and $E \sin (\omega t + \pi/2)$ which have the same amplitude and frequency but which are in quadrature. Each of these alternating voltage supplies is connected across one of the examining or scanning capacitors C1 and C2 and its associated small reference capacitor C3 and C4 respectively. The signals appearing across the reference capacitors C3 and C4 are separately amplified and subjected to phase-sensitive demodulation by circuits A1 and A2 respectively, the demodulating signal being taken from the same alternating voltage supply that feeds the scanning capacitor belonging to the channel.

The scanning capacitor C1 is made up of two small plates $a$ and $b$ sited on opposite sides of an article M which may be a sheet of a plastic material. The scanning capacitor C2 is made up of two small plates $x$ and $y$ adjacent to the plates $a$ and $b$ respectively. Signals arising because of the capacitances $C_{ay}$ and $C_{xb}$ between the plates $a$ and $y$ and the plates $b$ and $x$ respectively are prevented from interfering with the wanted signals in the circuits A1 and A2 as, through being 90 degrees out of phase with the demodulating signals in each channel, they are arranged to produce no rectified output in a manner which will be more fully described with reference to Figure 3. The outputs from the circuits A1 and A2 thus correspond to the alternating currents transmitted in the direct path only across the article M, that is via the capacitors C1 and C2. The outputs from the circuits A1 and A2 are fed to a differential valve voltmeter circuit V in which they are compared. Alternatively they may be compared in a differential D.C. oscilloscope.

Figure 2:
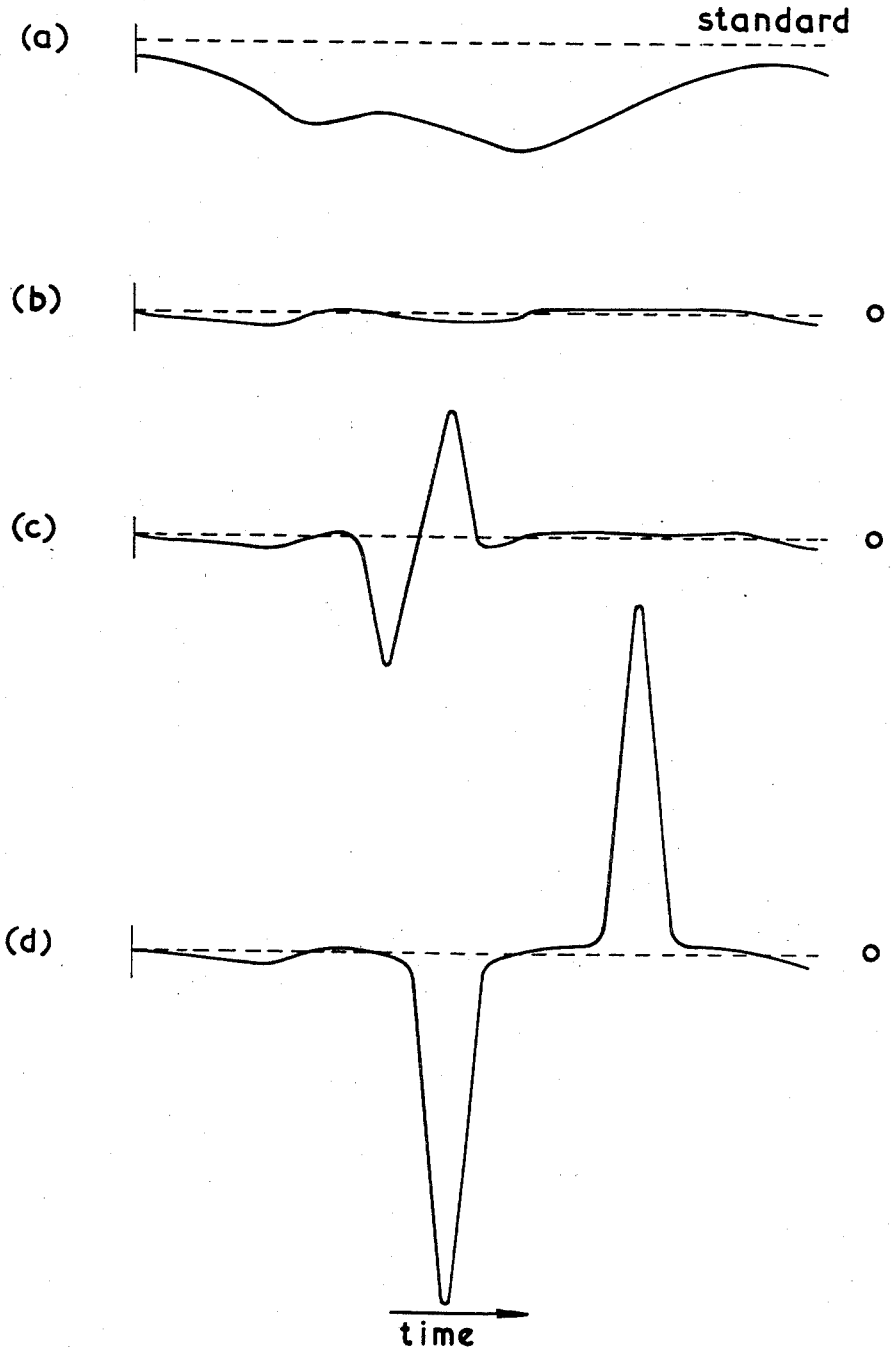
Figure 2 shows typical readings produced by the apparatus.

In operation, the article M is caused to move across steadily relative to the capacitor plates so that each part of the article moves between one and then the other pair of plates in rapid succession. The thickness of the article M acting as dielectric in each of the capacitors C1 and C2 is approximately the same even though the article has been moulded and shrinkage has occurred and the resulting out of balance readings from the voltmeter V are slight in the absence of other defects. A typical recording in these circumstances is shown in Figure 2(b) for a thickness variation in the article as shown in Figure 2(a).

If however a void or local defect occurs which passes between the two sets of plates in sequence the circuits are sharply unbalanced, first in one sense and then in the other and a clear and easily recognized indication is produced. A recording in which a single small void is detected is shown in Figure 2(c) while one in which a large void is detected is shown in Figure 2(d).

Figure 3:
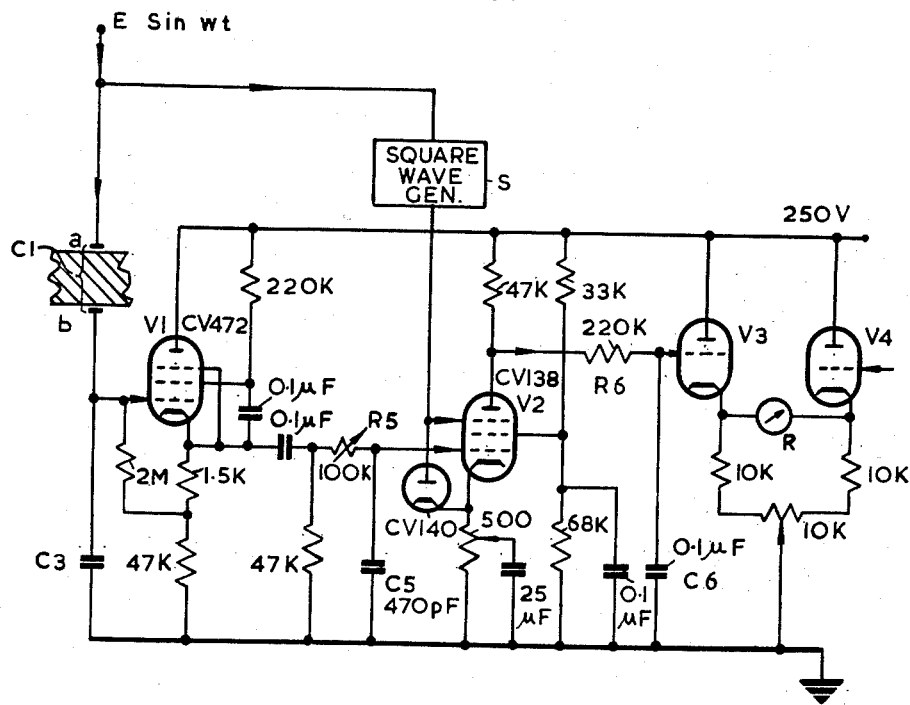

A detailed circuit diagram of one possible form of the circuit A1 is shown in Figure 3. The circuit A2 would of course be identical. The alternating voltage E sin $\omega t$ is applied across the scanning capacitor C1 and its reference capacitor C3. The voltage developed across the capacitor C3, which is of course dependent upon the capacitance of the capacitor C1, is applied to a cathode follower valve V1 and thence through an adjustable phasing network made up of a variable resistor R5 and a capacitor C5 to the control grid of a pentode valve V2 which functions as an amplifier and gating circuit.

The alternating voltage E sin $\omega t$ is also applied to a square wave generator S which, when the applied voltage has a waveform as shown in Figure 4(a), is arranged to produce an output voltage having a virtually square waveform of the input frequency but phase changed by 180 degrees. This output is applied to the suppressor grid of the valve V2 to produce voltage changes thereon as shown in Figure 4(b) which render the anode circuit of the valve conducting and non-conducting in alternate half cycles. The consequential waveform of the anode voltage in the absence of a signal on the control grid is shown in Figure 4(c).

During operation however, when a signal is applied to the control grid of the valve V2 the anode voltage waveform will be modified during the conducting half cycles so that if the grid signal waveform is as shown in Figure 4(d) the resultant anode voltage waveform is as shown in Figure 4(e). It will be seen that the mean level of the anode voltage has been raised. This mean level is a maximum when the signal on the control grid as shown in Figure 4(d) is in step with the anode voltage waveform as shown in Figure 4(c) due to the signal on the suppressor grid. The correct phase relationship between the control grid and suppressor grid inputs to the valve V2 is consequently obtained by adjusting the phase shifting network comprising the resistor R5 and the capacitor C5 to produce a maximum mean anode voltage for the valve V2 with the article to be tested in position but with the alternating voltage supply disconnected from the capacitor C2.

In these circumstances during operation any signal applied to the control grid of the valve V2 due to interaction between the capacitor plates $x$ and $b$ will be 90 degrees out of phase with the square waveform voltage on the suppressor grid and will have a waveform as shown in Figure 4(f) as far as phase is concerned. The resulting anode voltage waveform is as shown in Figure 4(g) while disregarding the effect of any wanted grid signal. It will be seen from Figure 4(g) that any unwanted signal due to cross interaction between the plates $x$ and $b$ produces no change in the mean level of the anode voltage.

The signal on the anode of the valve V2 is passed through a filter comprising the resistor R6 and the capacitor C6 which removes signals at the frequency of the oscillator 1 and harmonics thereof, so that the mean anode voltage is transmitted. The filter output is applied to the grid of a valve V3 which together with a similar valve V4 is connected to make up a balanced D.C. valve voltmeter. The other circuit A2 is arranged and adjusted in a similar manner to the circuit A1 to deal with signals produced across the reference capacitor C4 and produce a filtered output which is applied to the grid of the valve V4. The valve voltmeter thus responds to the difference between the two input signals. A difference reading is given by a meter R connected between the cathodes of the valves V3 and V4 as shown.

Figure 4:
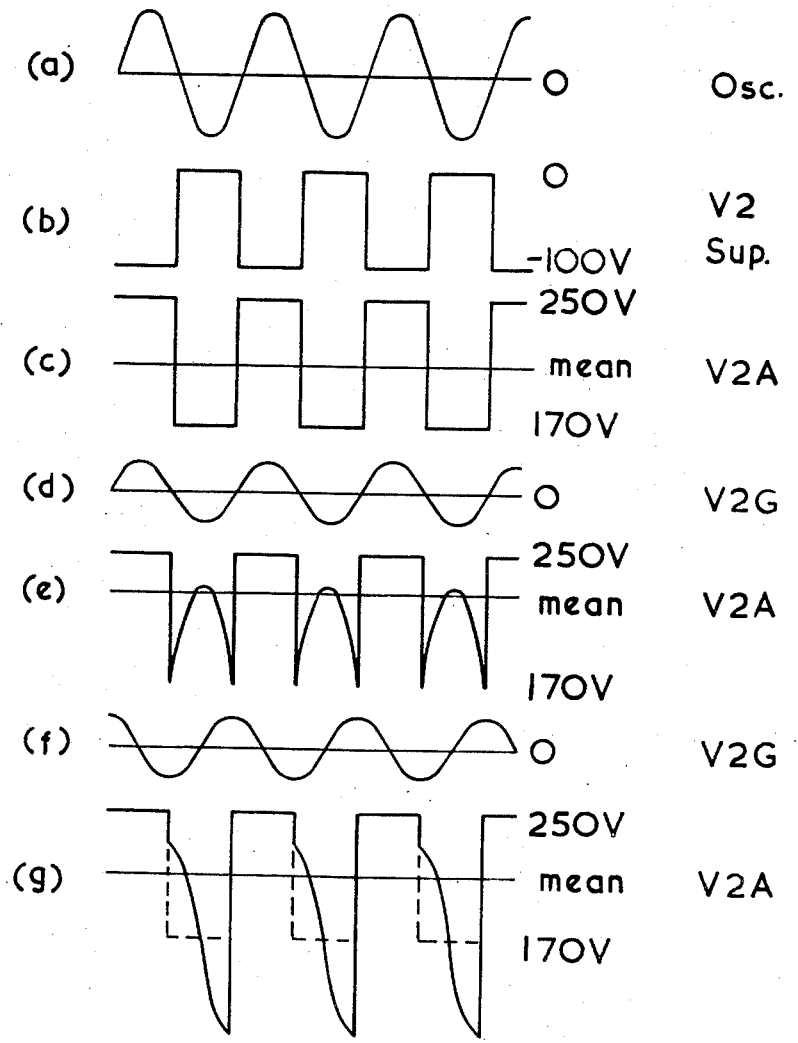
Figure 4 shows waveforms of voltages occurring at various parts of the circuit shown in Figure 3.

The circuits which have now been described with reference to Figures 3 and 4 may be used in a testing apparatus which employs two electromagnetic pick-up heads to examine the article under test. In this case where the impedance of the heads is inductively reactive, the reference capacitors C3 and C4 as shown in Figures 1 and 3 may be replaced in each case by inductors.

We claim:

1. An electrical testing apparatus comprising two similar alternating current channels, each channel containing an electrical circuit component which has a reactive impedance, said two components being electrically equivalent to each other and positioned adjacent to each other while capable of being sited close to an article under test and thereby subject to having their respective reactive impedances varied, means for feeding the two channels with alternating currents which are in quadrature, two phase-sensitive circuits coupled respectively in said channels for producing signals in accordance with the current flow through the respective channels during half cycles in which the alternating current applied thereto is in a given sense, and a comparison circuit coupled to the phase-sensitive circuits to receive said signals for producing an output signal in accordance with the difference between the signals produced by the two phase-sensitive circuits.

2. An electrical testing apparatus comprising two similar alternating current channels, each channel containing an electrical circuit component which has a reactive impedance, said two components being electrically equivalent to each other and positioned adjacent to each other while capable of being sited closed to an article under test and thereby subject to having their respective reactive impedances varied, means for feeding the two channels with alternating currents which are in quadrature, a phase-sensitive circuit for each channel which comprises a reference impedance component in series with the said electrical circuit component, a gating circuit, means for deriving from the alternating current applied to the channel a control voltage which is applied to the gate circuit to open it during the half cycles of the alternating current during which the current flow is in a given sense, and means for applying to the gate circuit a signal derived from the voltage produced across the said reference component whereby the gate circuit produces a signal in accordance with the current flow through the channel during the half cycles in which the gate circuit is open, the electrical testing apparatus also having a comparison circuit which is fed with the signals from the gate circuits of the two phase-sensitive circuits and which produces an output signal in accordance with the difference between the signals produced by the two gate circuits.

3. An electrical testing apparatus comprising two similar alternating current channels, each channel containing a capacitor having a pair of plates, the corresponding plates of each pair being placed side by side so that an article to be tested can be passed between the two pairs of plates under similar conditions to act as the dielectric of the capacitors, means for feeding the two channels with alternating currents which are in quadrature, two phase-sensitive circuits coupled respectively in said channels for producing signals in accordance with the current flow through the respective channels during half cycles in which the alternating current applied thereto is in a given sense, and a comparison circuit coupled to the phase-sensitive circuits to receive said signals for producing an output signal in accordance with the difference between the signals produced by the two phase-sensitive circuits.

4. An electrical testing apparatus according to claim 3 and in which each phase-sensitive circuit has a reference capacitor in series with the capacitor used to examine an article to be tested.

5. An electrical testing apparatus according to claim 3 and in which the phase-sensitive circuit in each channel comprises a reference impedance component in series with the said capacitor, a gating circuit, means coupled to the channel for deriving from the applied alternating current a control voltage signal and for applying the control signal to the gate circuit to open it during the half cycles of the alternating current during which the current flow is in a given sense, and means coupled to the reference component in the channel for applying to the gate circuit a signal derived from the voltage produced across the said reference component whereby the gate circuit produces a signal in accordance with the current flow through the channel during the half cycles in which the gate circuit is open.

6. An electrical testing apparatus according to claim 3 and in which the phase-sensitive circuit in each channel includes a square wave generator which is supplied with the alternating current fed to the channel and which produces a voltage output having a rectangular waveform in step with the supplied current, a pentode valve circuit, means for applying the output of the square wave generator to the suppressor grid connection of the pentode valve circuit whereby the anode current of the valve is cut off during the negative-going half cycles of the voltage on the suppression grid, a reference impedance component in series with the said capacitor, means for applying to the control grid connection of the pentode valve circuit a signal in accordance with the voltage produced across the reference impedance component, and means for deriving a signal from the anode circuit of the pentode valve circuit.

7. An electrical testing apparatus according to claim 6 and in which the said reference impedance component is a reference capacitor.

8. An electrical testing apparatus according to claim 6 and having adjustable phase-modifying means in one of the two signal inputs to the said gate circuit.

9. An electrical testing apparatus according to claim 5 and further including means coupled to said gate circuit for phase-modifying one of the two signal inputs thereto.

10. An electrical testing apparatus comprising two similar alternating current channels, each channel containing an electrical circuit component which has a reactive impedance, said two components being electrically equivalent to each other and positioned adjacent to each other while capable of being sited close to an article under test and thereby subject to having their respective reactive impedances varied, means for feeding the two channels respectively with, and thus subjecting said circuit components respectively, to two alternating currents which are substantially out of both phase and anti-phase, two phase-sensitive circuits coupled respectively in said channels for producing signals in accordance with the current flow through the respective channels during periods each of not more than a half-cycle in which the alternating current applied thereto is in a given sense and the alternating current applied to the other channel changes its sense, and a comparison circuit coupled to the phase-sensitive circuits to receive said signals for producing an output signal in accordance with the difference between the signals produced by the two phase-sensitive circuits.

11. An electrical testing apparatus comprising two similar alternating current channels, each channel comprising a capacitor having a pair of plates, the corresponding plates of each pair being placed side by side so that an article to be tested can be passed between the two pairs of plates under similar conditions to act as at least a part of the dielectric of the capacitors, means for feeding the two channels respectively with, and thus subjecting said capacitors respectively to, two alternating currents which are substantially out of both phase and anti-phase, two phase-sensitive circuits coupled respectively in said channels for producing signals in accordance with the current flow through the respective channels during periods each of not more than a half-cycle in which the alternating current applied thereto is in a given sense and the alternating current applied to the other channel changes its sense, and a comparison circuit coupled to the phase-sensitive circuits to receive said signals for producing an output signal in accordance with the difference between the signals produced by the two phase-sensitive circuits.

References Cited in the file of this patent

UNITED STATES PATENTS

| 2,535,027 | Anderson | Dec. 26, 1950 |
| 2,555,977 | Kline | June 5, 1951 |

FOREIGN PATENTS

| 591,172 | Great Britain | Aug. 8, 1947 |